(12) United States Patent
Bentor et al.

(10) Patent No.: US 9,993,754 B2
(45) Date of Patent: Jun. 12, 2018

(54) FLUID CONTAMINATION PREVENTION SYSTEM

(71) Applicants: Yoram Bentor, Kibbutz Bet Zera (IL);
Ra'anan Ben-Horin, Kibbutz Bet Zera (IL)

(72) Inventors: Yoram Bentor, Kibbutz Bet Zera (IL);
Ra'anan Ben-Horin, Kibbutz Bet Zera (IL)

(73) Assignee: AMIAD WATER SYSTEMS LTD., D.N. Upper Galil (IL)

( * ) Notice: Subject to any disclaimer, the term of this patent is extended or adjusted under 35 U.S.C. 154(b) by 698 days.

(21) Appl. No.: 14/357,294

(22) PCT Filed: Nov. 14, 2012

(86) PCT No.: PCT/IL2012/050458
§ 371 (c)(1),
(2) Date: May 9, 2014

(87) PCT Pub. No.: WO2013/072912
PCT Pub. Date: May 23, 2013

(65) Prior Publication Data
US 2014/0305854 A1  Oct. 16, 2014

Related U.S. Application Data

(60) Provisional application No. 61/559,384, filed on Nov. 14, 2011.

(51) Int. Cl.
*B01D 35/30* (2006.01)
*B01D 29/92* (2006.01)
(Continued)

(52) U.S. Cl.
CPC ............ *B01D 35/30* (2013.01); *B01D 29/117* (2013.01); *B01D 29/52* (2013.01); *B01D 29/92* (2013.01);
(Continued)

(58) Field of Classification Search
CPC ........ B01D 2201/34; B01D 2201/0438; B01D 2201/204; B01D 27/08; B01D 35/30;
(Continued)

(56) References Cited

U.S. PATENT DOCUMENTS 1,328,221 A    1/1920  Zahm
4,119,540 A *  10/1978 Muller ................. B01D 29/117
                                                        210/142

(Continued)

FOREIGN PATENT DOCUMENTS

CN    1266731 A    9/2000
CN    2573048 Y    9/2003
(Continued)

OTHER PUBLICATIONS

The Chinese Search Report, dated Oct. 23, 2015, one page.

*Primary Examiner* — Terry K Cecil
(74) *Attorney, Agent, or Firm* — Vorys, Sater, Seymour & Pease LLP; Ari Zytcer

(57) ABSTRACT

The disclosed subject matter is directed to a fluid treating system comprising a housing configured with at least one fluid inlet port and at least one fluid outlet port, with at least one fluid treating chamber disposed between and being in flow communication with the at least one fluid inlet port and at least one fluid outlet port, and at least one intermediate chamber disposed between at least one inlet port and at least one of the fluid treating chamber and outlet port. The at least one intermediate chamber is vented to the atmosphere or coupleable to a vacuum source.

12 Claims, 10 Drawing Sheets

(51) Int. Cl.
*B01D 36/00* (2006.01)
*B01D 29/11* (2006.01)
*B01D 29/52* (2006.01)

(52) U.S. Cl.
CPC ...... *B01D 36/001* (2013.01); *B01D 2201/204* (2013.01); *B01D 2201/34* (2013.01)

(58) Field of Classification Search
CPC .................. B01D 36/001; B01D 29/52; B01D 29/117–29/118; B01D 29/23; B01D 29/35; B01D 2201/043–2201/0403
See application file for complete search history.

(56) References Cited

U.S. PATENT DOCUMENTS

| | | | |
|---|---|---|---|
| 4,248,714 A | | 2/1981 | Acosta |
| 4,319,997 A | * | 3/1982 | Pett ........................ B01D 27/08 |
| | | | 210/248 |
| 4,331,535 A | | 5/1982 | Pett |
| 6,799,687 B1 | * | 10/2004 | Schon .................. B01D 29/117 |
| | | | 210/333.1 |
| 2006/0163128 A1 | * | 7/2006 | Scragg .................. B01D 33/073 |
| | | | 210/121 |

FOREIGN PATENT DOCUMENTS

| | | | | |
|---|---|---|---|---|
| CN | 2759563 Y | | 2/2006 | |
| CN | 2822850 Y | | 10/2006 | |
| DE | 3621724 A1 | * | 1/1988 | ........... B01D 29/117 |
| WO | 2012/073247 A1 | | 6/2012 | |
| WO | 2013/054332 A2 | | 4/2013 | |

* cited by examiner

FLUID CONTAMINATION PREVENTION SYSTEM

TECHNOLOGICAL FIELD

This invention relates to fluid treating systems and more particularly to systems configured with a partition compartment for preventing mixing and contamination of fluids at an upstream and a downstream of the concerned system.

BACKGROUND

An important consideration in treating of liquids is to prevent contamination of untreated liquid with treated liquid. One suitable example exemplifying the need is a filtration devise wherein raw liquid enters a filtration unit, with filtered liquid exiting therefrom. It is required to prevent sealing breakthrough (at times this may be referred to as a 'gasket/seal shortcut', or as a 'sealing element override' of raw liquid towards the filtered (treated) liquid to prevent contamination thereof.

Another example is a liquid mixing system where a first liquid, say fresh water, is mixed with some chemical agent and the mixtures then egresses through an outlet of the liquid treating system. It is a requirement that the chemical agent does not flow downstream in direction of the first liquid, possibly contaminating the fresh water or even worse posing a hazardous situation.

Various solutions are generally proposed to reduce the likelihood of leak between upstream and downstream flow portions of a liquid treating system. Most common are sealing arrangements including various gaskets, O-rings, surface-to-surface contact sealing, etc.

However, it often occurs that such sealing arrangements are insufficient or fail, e.g. owing to high pressure fluids managing to overcome such sealing arrangements, or for example owing to the presence of dirt at the sealing vicinity (which may enter during assembly of the device or be carried thereto by the fluid), or owing to misplacing or pinching of a sealing member during assembly, or even owing to wear during the regular course of use which might take place both in the case of static devices and dynamic devices where one or more elements displace linearly and/or rotatably about a sealing element, where in the later case (dynamic devices) wear is generally increased.

GENERAL DESCRIPTION

A fluid treating system as referred to hereinafter in the specification and claims denotes any fluid system configured with at least one fluid inlet and at least one manipulating chamber in which the fluid undergoes treatment of any type prior to egress through at least one fluid outlet.

Treating fluid as referred to hereinafter in the specification and claims denotes any sort of fluid treatment e.g. filtration, mixing of two or more fluid components, chemical treating, etc.

The present disclosed subject matter provides an arrangement configured for preventing or significantly reducing fluid mixing/contaminating within a fluid treating system.

According to the disclosed subject matter there is provided a fluid treating system comprising a housing configured with at least one fluid inlet port and at least one fluid outlet port, with at least one fluid treating chamber disposed between and being in flow communication with said at least one fluid inlet port and at least one fluid outlet port, and at least one intermediate chamber disposed between at least one inlet port and at least one of the fluid treating chamber and outlet port; wherein the at least one intermediate chamber is vented to the atmosphere or coupleable to a vacuum source.

The arrangement is such that the pressure at each respective inlet port $P_{in}$, and the pressure at the fluid treating chamber $P_{tc}$ or at the outlet pressure $P_{out}$ is higher than the pressure at the intermediate chamber $P_s$, namely:

$$P_{in} > P_s < P_{out}$$

And likewise:

$$P_{in} > P_{tc} < P_{out}$$

However, the pressure at the fluid treating chamber $P_{tc}$ may be substantially equal to the pressure at the outlet port, i.e. $P_{tc} = P_{out}$.

The arrangement being such that a leak occurring at any location within the fluid treating system will flow from a high pressure zone towards a low pressure zone, i.e. any leaks within the fluid system will flow into an intermediate chamber, resulting in that at the event of a leak occurring in the system, any leakage fluid flows to the intermediate chamber from where it is drained, and however does not flow between regions having different fluids so as to avoid mixing and/or contamination thereof.

According to another aspect of the disclosed subject matter, there is provided a fluid filter system comprising a housing configured with at least one fluid inlet port and at least one fluid outlet port, with at least one fluid treating chamber disposed between and being in flow communication with said at least one fluid inlet port and at least one fluid outlet port, and at least one intermediate chamber disposed between at least one inlet port and at least one of the fluid treating chamber and the at least one fluid outlet port; wherein the at least one intermediate chamber is vented to the atmosphere or coupleable to a vacuum source.

In accordance with an example, the arrangement is such that the pressure at each respective inlet port Pin, and the pressure at the fluid treating chamber Ptc or at the outlet pressure Pout is higher than the pressure at the at least one intermediate chamber Ps.

The arrangement is such that the fluid inlet port extends into a raw fluid chamber and at least one filtration module extends between the raw fluid chamber and the at least one fluid treating chamber. In accordance with an example, two filtration modules are provided. The at least one fluid treating chamber is separated from the raw fluid chamber by at least two partition walls.

In accordance with an example, the at least two partition walls are substantially parallel to each other and define a space therebetween, thereby defining the at least one intermediate chamber. In accordance with yet an example, at least three partition walls are provided, defining therebetween at least two intermediate chambers.

Any one or more of the following design and configurations can be applied to a fluid treating system, separately or in combinations:

According to one particular example, the liquid treating chamber and the at least one outlet port are in direct flow communication and reside at substantially the same pressure;

An intermediate chamber is common with an upstream side of the fluid treating system and the downstream side of the fluid treating system;

An independent intermediate chamber is associated with an upstream side of the fluid treating system and with the downstream side of the fluid treating system, i.e.

with an inlet port and with an outlet port thereof. The independent intermediate chambers being distinct, i.e. not extending in direct flow communication;

The intermediate chamber is vented to the atmosphere or exposed to vacuum;

Sealing between the ports and chambers within the fluid treating system can take place by various gaskets, O-rings, surface-to-surface contact sealing, etc.;

The intermediate chamber is configured for coupling to a drain pipe;

An outlet of the intermediate chamber is fitted with a one way valve or trap, to prevent egress of fluids, dirt, insects and the like into said intermediate chamber. Substantially there is no pressure drop over the barrier;

The fluid treating system according to the disclosed subject matter is configured for treating any fluid, i.e. liquids or gases or combinations thereof;

The fluid treating system according to the disclosed subject matter is configured for use in connection with different fluid treating applications in different industries and purposes, including, but not limited, pharmaceutical industry, medical use (e.g. drug administration, etc.), food industry, chemical industry, and the like;

A fluid treating system, wherein the fluid treating system is a liquid filter unit.

BRIEF DESCRIPTION OF THE DRAWINGS

In order to understand the present disclosed subject matter and to see how it may be carried out in practice, embodiments will now be described, by way of non-limiting examples only, with reference to the accompanying drawings, in which:

FIGS. 8A-8C are schematic representations illustrating different configurations of fluid treating systems, wherein:

FIG. 8A illustrates a fluid treating system comprising an intermediate chamber common with an inlet port and an outlet port;

FIG. 8B illustrates a fluid treating system comprising an intermediate chamber independently associated with an inlet port and with an outlet port;

FIG. 8C illustrates a fluid treating system comprising an intermediate chamber independently associated with two inlet ports and outlet port.

DETAILED DESCRIPTION OF EMBODIMENTS

Figure 1:
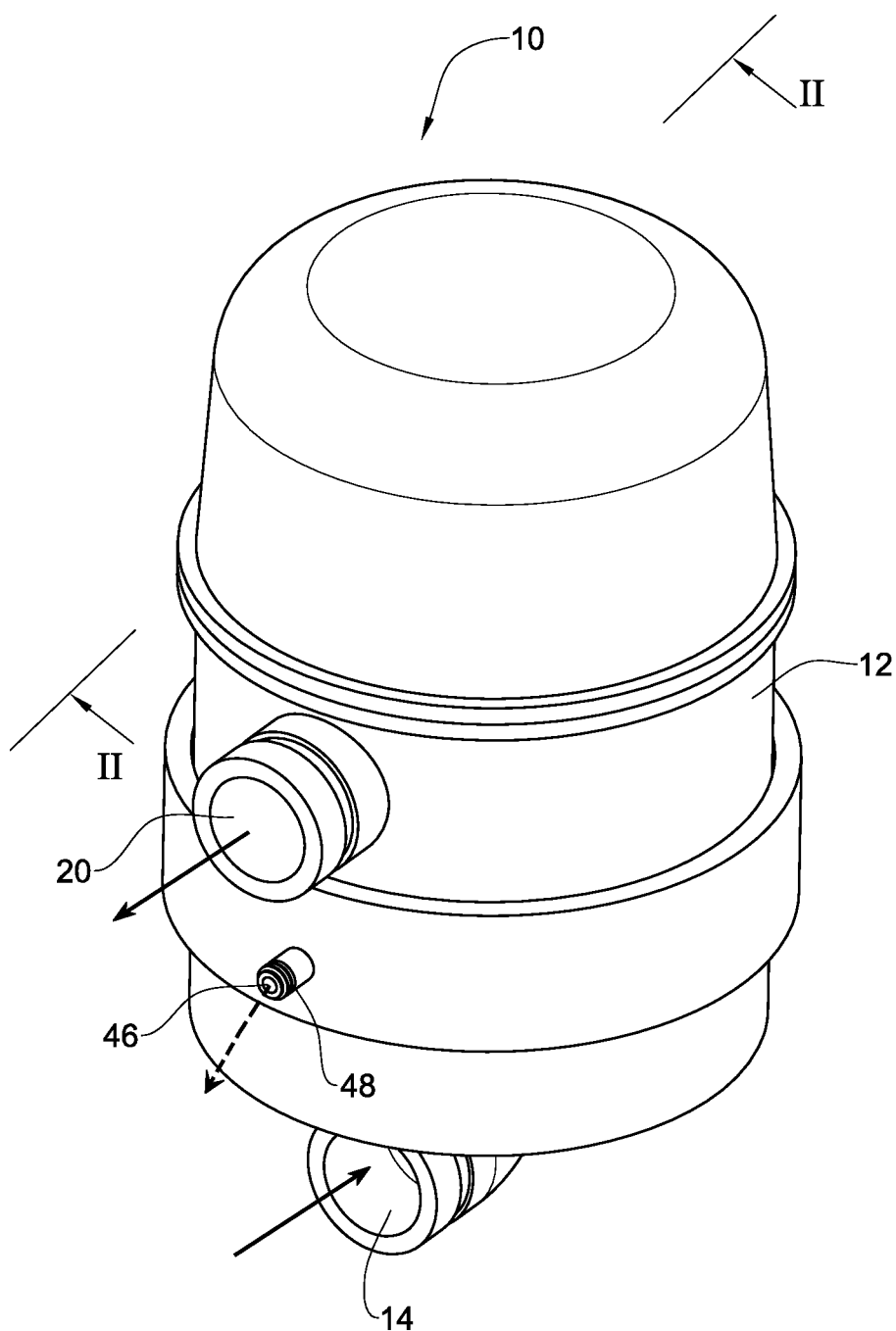
FIG. 1 is top perspective view of a fluid filter according to a first example of the present disclosed subject matter.
Figure 2:
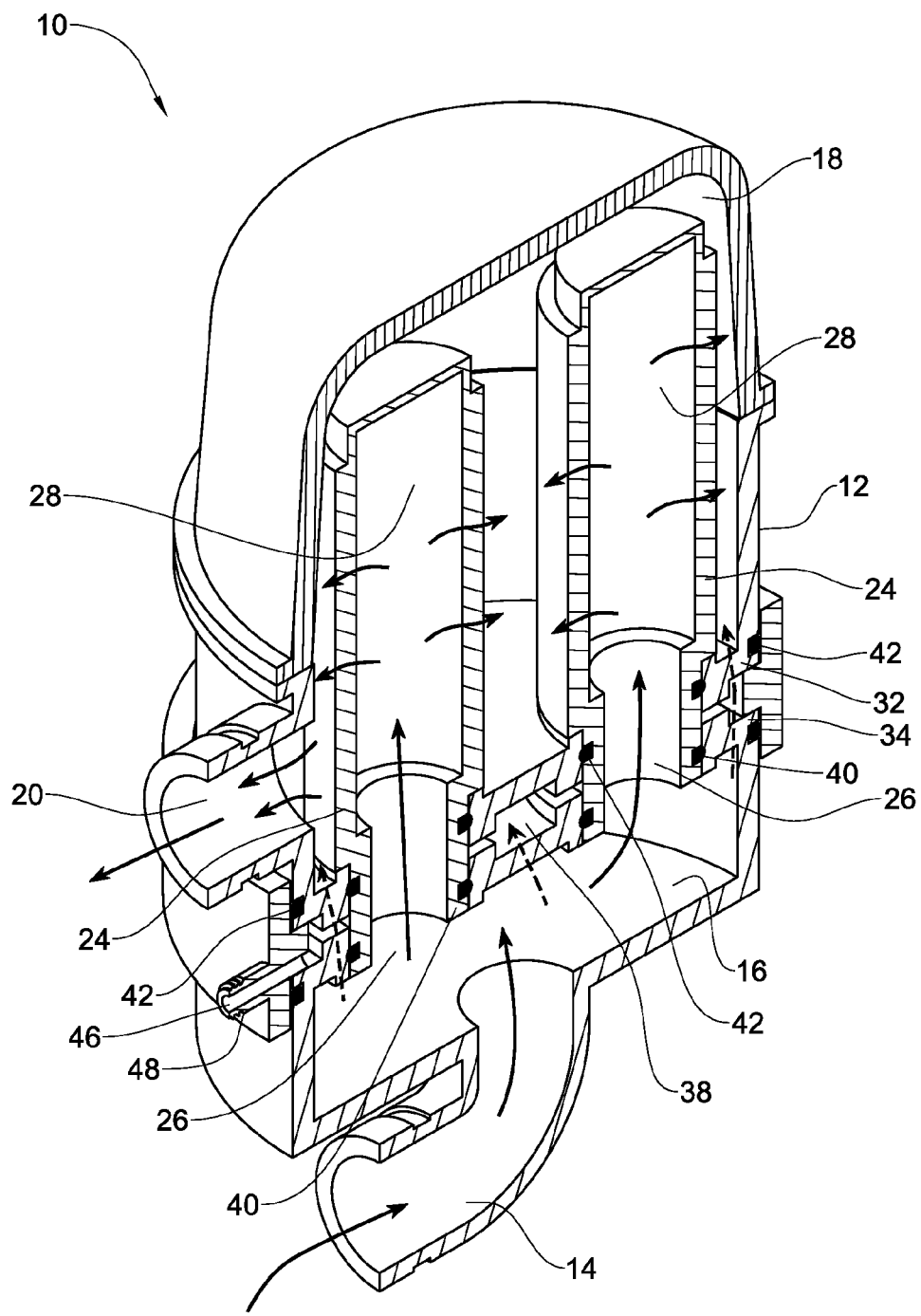
FIG. 2 is a longitudinal section along line II-II in FIG. 1.
Figure 3:
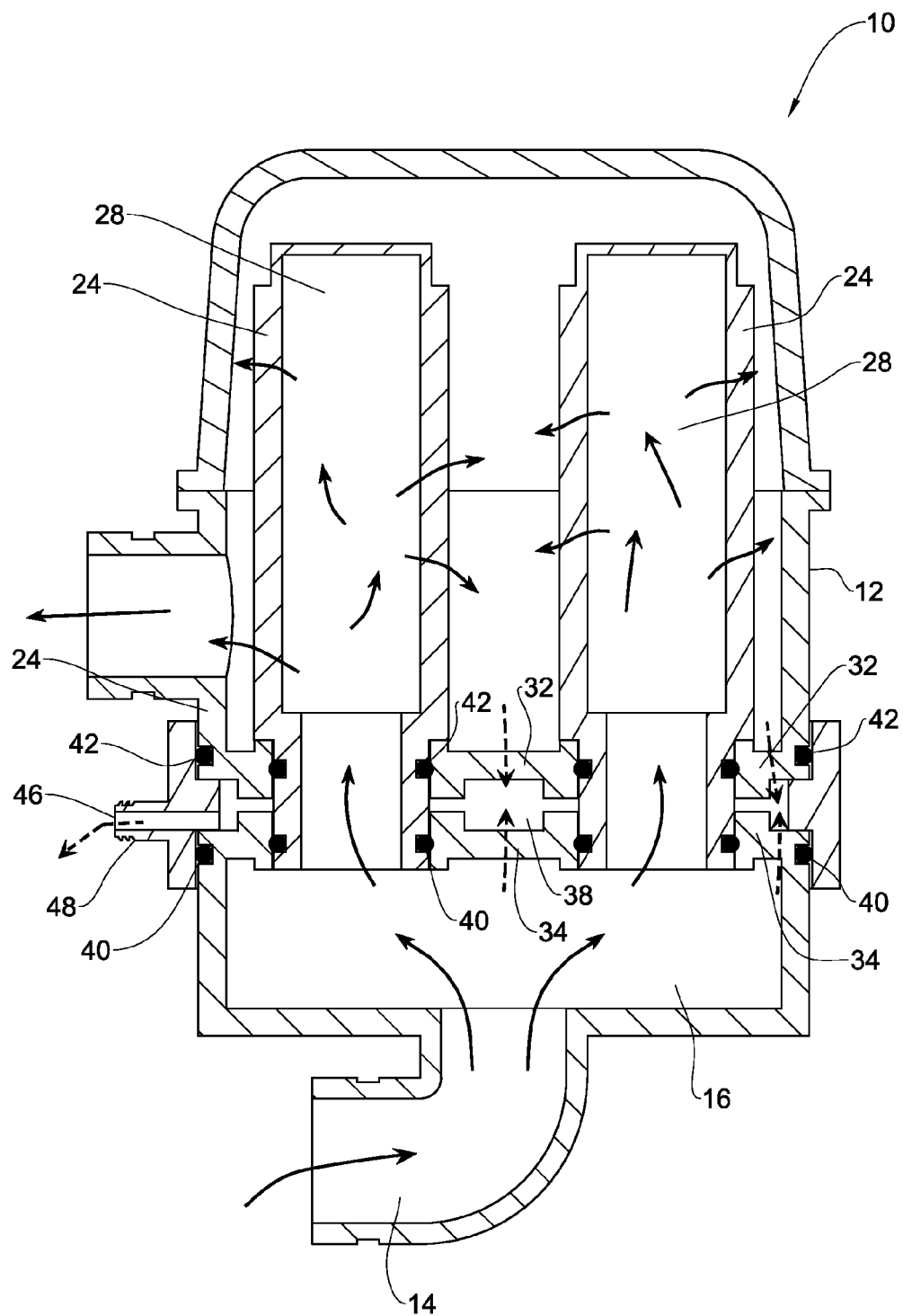
FIG. 3 is planer view of FIG. 2.
Figure 8A:
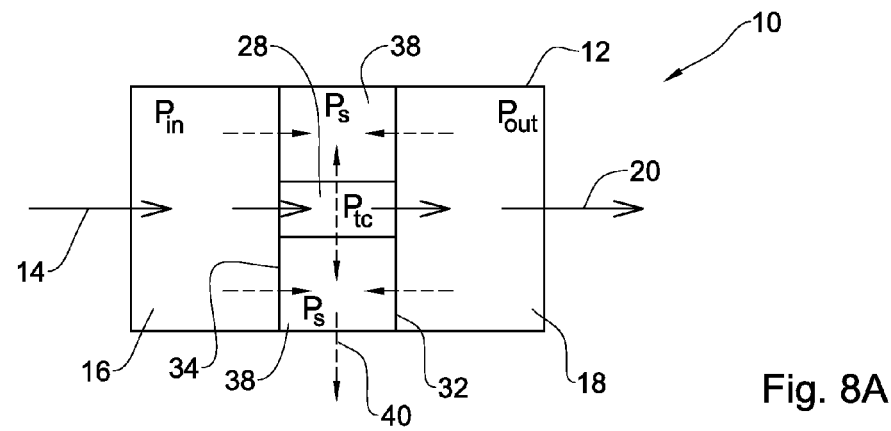

Attention is first directed to FIGS. 1 to 3 of the drawings and to FIG. 8A, illustrating a fluid treating system namely a liquid filter unit generally designated 10.

The fluid treating system 10 comprises a cylindrical housing 12 configured with a fluid inlet port 14 (raw fluid inlet port) configured at a bottom portion of the housing 12 and extending into a raw fluid chamber 16. Extending at an upper portion of the housing 12 there is a fluid treating chamber 18 configured with a fluid outlet port 20. It is appreciated however, that fluid flow may take place in reverse direction too.

Extending between the raw fluid chamber 16 and the fluid treating chamber 18 there are configured a pair of filtration modules 24 having an inlet 26 extending within the raw fluid chamber 16, said inlet 26 extending into a filtration space 28 of each of the filtration modules 24.

It is appreciated that the filtration modules 24 can be any type of filtration module e.g. disc-type filtration modules, pile-type filtration modules, thread-type filtration modules, screen-type filtration modules, and the like.

It is further appreciated that the number and configuration of the filtration modules may vary and further, rather then filtration modules there may be provided one or more other fluid treating units, e.g. mixers and the like.

It is further noted that the fluid treating chamber 18 is separated from the raw fluid chamber 16 by two partition levels (i.e. walls), namely partition 32 and partition 34, thus defining between them an intermediate chamber 38.

The intermediate chamber 38 is sealingly separated from the raw fluid chamber 16 and likewise from the fluid treating chamber 18 by a plurality of sealing members which in the present example are O-rings 40 and 42 extending between the lower partition 34 and respective portions of the raw fluid chamber 16 and likewise between the upper partition 32 and respective portions of the fluid treating chamber 18. However, it is appreciated that different sealing means may be provided such as a gasket, face-to-face sealing contact, etc.

Extending from the intermediate chamber 38 there is an outlet port 46 open to the atmosphere and configured with an external threading at 48 configured for coupling to a drainage pipe (not shown) or to a barrier to prevent egress of liquids, dirt, insects and the like.

The arrangement of the disclosure being such that raw fluid entering through fluid inlet port 14 flows through the raw fluid chamber 16, through the inlets 26 of the filtration modules 24 wherein the fluid undergoes filtration by pressurizing it through the filtration modules 24 out to the fluid treating chamber 18 and then out of the filter treating system 10 through fluid outlet port 20. The fluid flow path is represented in the drawings by solid arrows.

At the event of leakage between the sealing arrangement extending between the raw fluid chamber 16 and the intermediate chamber 38, and/or between the fluid treating chamber 18 and the intermediate chamber 38, and/or between supports of the filtration modules 24 and the intermediate space 38, any leaking fluids will necessarily flow from high pressure to low pressure zone i.e. into the intermediate chamber 38 which is vented to the atmosphere.

It is however appreciated that rather than being vented to the atmosphere the intermediate chamber 38 may reside at low pressure, i.e. at vacuum.

In FIGS. 2 and 3 a solid set of arrows represents fluid flow during the normal course of filtering a fluid entering the raw fluid chamber 16 of the fluid treating system 10 via inlet port 14 and then into the filtration modules 24 wherein the fluid under pressure passes through the filtration media and exits from the filtration space 28 into the fluid treating chamber 18 and then exiting the system through outlet port 20. However, at the event of leakage, e.g. owing to failure or pinching of the O-rings 40 or 42 or owing to presence of dirt between the sealing components of the assembly, fluid may leak, as indicated by dashed arrows, from the raw fluid chamber 16 and/or from the fluid treating chamber 18 or from the vicinity of the filtration modules 24 into the intermediate chamber 38 and from there out through the port 48.

The arrangement disclosed in FIGS. 1-3 is schematically represented in the flow chart of FIG. 8A wherein solid arrowed lines represent pressurized fluid flow during the course of its treating within the fluid treating system 10 and dashed arrowed lines represent leakage between either/or the raw fluid chamber, the fluid treating chamber or the filtration modules, as discussed hereinabove.

As represented in FIG. 8A, the pressure $P_{in}$ the inlet port 14 and at the raw fluid chamber 16, and the pressure $P_{tc}$ at the fluid treating chamber 18 or the outlet pressure $P_{out}$ is higher than the pressure $P_s$ at the intermediate chamber 38, namely:

$$P_{in} > P_s < P_{out}$$

And likewise:

$$P_{in} > P_{tc} \geq P_{out}$$

Attention is now directed to FIGS. 4, 5A, 5B and 8B of the drawings, directed to another example of a fluid treating system generally designated 70. The fluid treating system 70 resembles that disclosed in connection with FIGS. 1 and 2, however with some differences as will be discussed herein below.

The fluid treating system 70 comprises a cylindrical housing 72 configured with a fluid inlet port 74 (raw fluid inlet port) configured at a bottom portion of the housing 72 and extending into a raw fluid chamber 76. Extending at an upper portion of the housing 72 there is a fluid treating chamber 78 configured with a fluid outlet port 80. It is appreciated however, that fluid flow may take place in reverse direction too.

Extending between the raw fluid chamber 76 and the fluid treating chamber 78 there are configured a pair of filtration modules 84 having an inlet 86 extending within the raw fluid chamber 76, said inlet 86 extending into a filtration space 88 of each of the filtration modules 84.

As discussed in connection with the example of FIGS. 1 and 2, it is appreciated that the filtration modules 84 can be any type of filtration module e.g. disc-type filtration modules, pile-type filtration modules, thread-type filtration modules, screen-type filtration modules and the like. Also, the number and configuration of the filtration modules may vary and further, rather then filtration modules there may be provided one or more other fluid treating units, e.g. mixers and the like.

It is further noted that the fluid treating chamber 78 is separated from the raw fluid chamber 76 by three partition levels (i.e. walls), namely partition 92, partition 94, and partition 96, thus defining between them two intermediate chambers, namely a first intermediate chamber 98 associated with the raw fluid chamber 76, and a second intermediate chamber 100 associated with the fluid treating chamber 78 and with a coupling portion of the filtration modules 84.

The first intermediate chamber 98 is sealingly separated from the raw fluid chamber 76 and the second intermediate chamber 100 is sealingly separated from the fluid treating chamber 78, and likewise said first intermediate chamber 98 is sealingly separated from the second intermediate chamber 100, by a plurality of sealing members which in the present example are O-rings 112, 114, 116 and 118. However, it is appreciated that different sealing means may be provided such as a gasket, face-to-face sealing contact, etc.

Extending from the first intermediate chamber 98 there are two outlet ports 126 open to the atmosphere and configured with an external threading at 128 configured for coupling to a drainage pipe (not shown) or to a barrier to prevent egress of liquids, dirt, insects and the like. Extending from the second intermediate chamber 100 there are two outlet ports 130 open to the atmosphere also configured with an external threading 128.

The arrangement of the disclosed example being such that raw fluid entering through fluid inlet port 74 flows through the raw fluid chamber 76, through the inlets 86 of the filtration modules 84 wherein the fluid undergoes filtration by pressurizing it through the filtration modules 84 out to the fluid treating chamber 78 and then out of the filter treating system 70 through fluid outlet port 80. The fluid flow path is represented in the drawings by solid arrows.

At the event of leakage between the sealing arrangement (i.e. the O-rings) extending between the raw fluid chamber 76 and the first intermediate chamber 98, and/or between the fluid treating chamber 78 and the second intermediate chamber 100, and/or between supports of the filtration modules 84 and either of the first and second intermediate chambers, any leaking fluids will necessarily flow from high pressure to low pressure zone i.e. into the either the first intermediate chamber 98 or into the second intermediate chamber 100 which are vented to the atmosphere.

It is however appreciated that rather than being vented to the atmosphere, either or both of the first intermediate chamber 98 and the second intermediate chamber 100 can reside at low pressure, i.e. at vacuum.

In FIG. 5 a solid set of arrows represents fluid flow during the normal course of filtering a fluid entering the raw fluid chamber 76 of the fluid treating system 70 via inlet port 74 and then into the filtration modules 84 wherein the fluid under pressure passes through the filtration media and exits from the filtration space 88 into the fluid treating chamber 78 and then exiting the system through outlet port 80. However, at the event of leakage, e.g. owing to failure or pinching of any one or more of the O-rings 112, 114, 116 and 118, or owing to presence of dirt between the sealing components of the assembly, fluid may leak, as indicated by dashed arrows, from the raw fluid chamber 76 and/or from the fluid treating chamber 78 or from the vicinity of the filtration modules 84 into the intermediate chambers 98 and 100, respectively and from there out through the respective ports 126 and 130.

Figure 4:
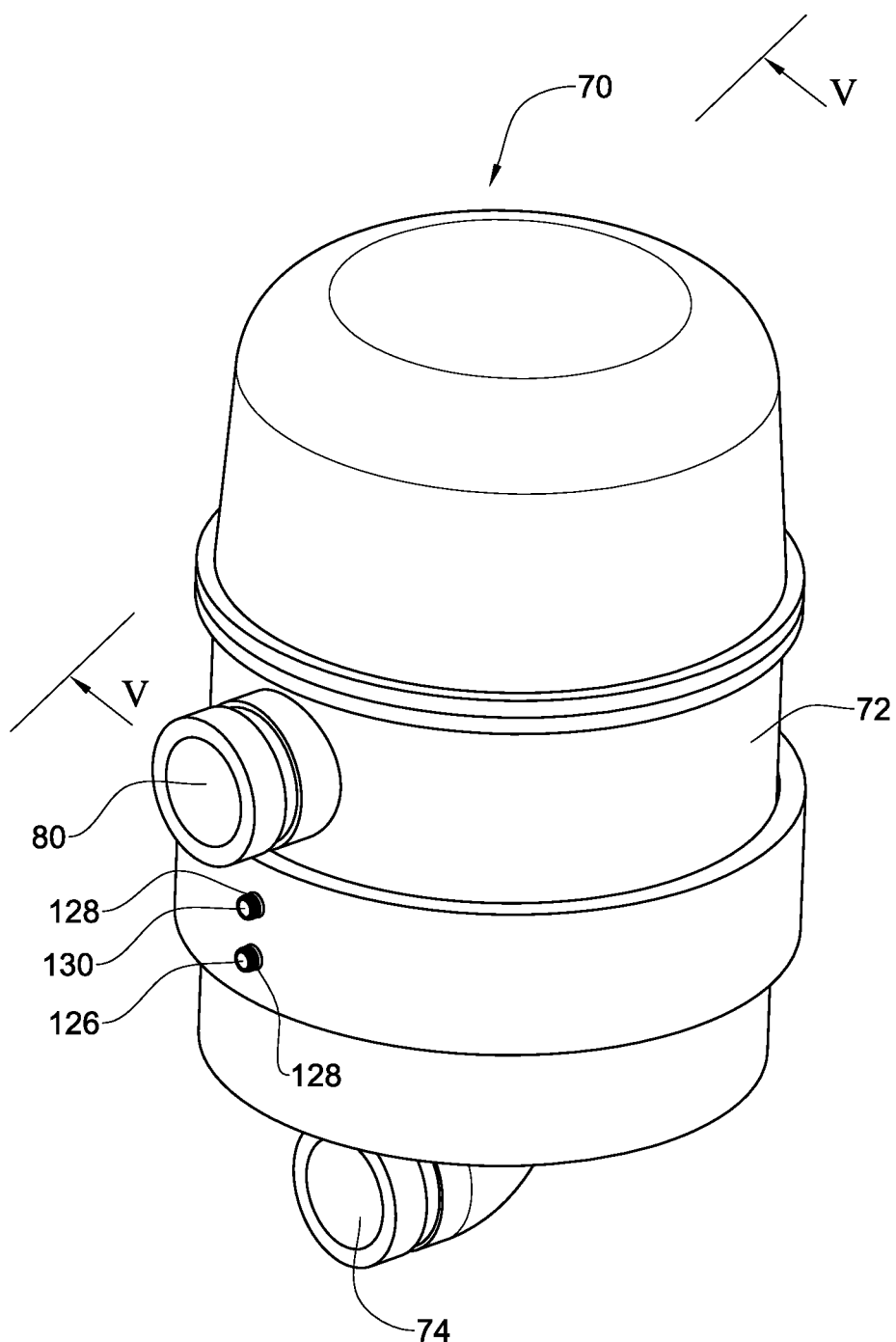
FIG. 4 is top perspective view of a fluid filter according to another example of the present disclosed subject matter.
Figure 5A:
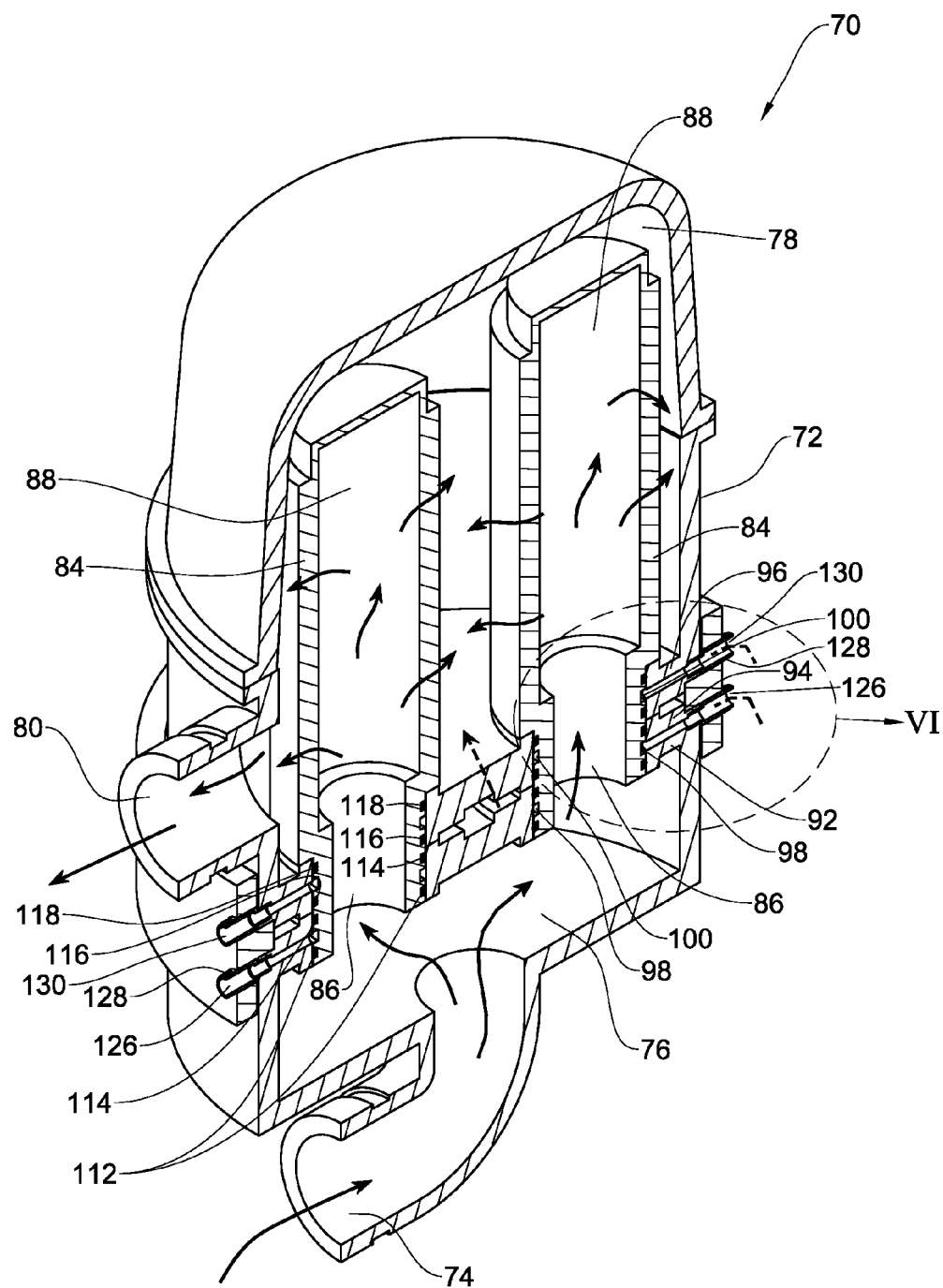
FIG. 5A is a longitudinal section along line V-V in FIG. 4.
Figure 5B:
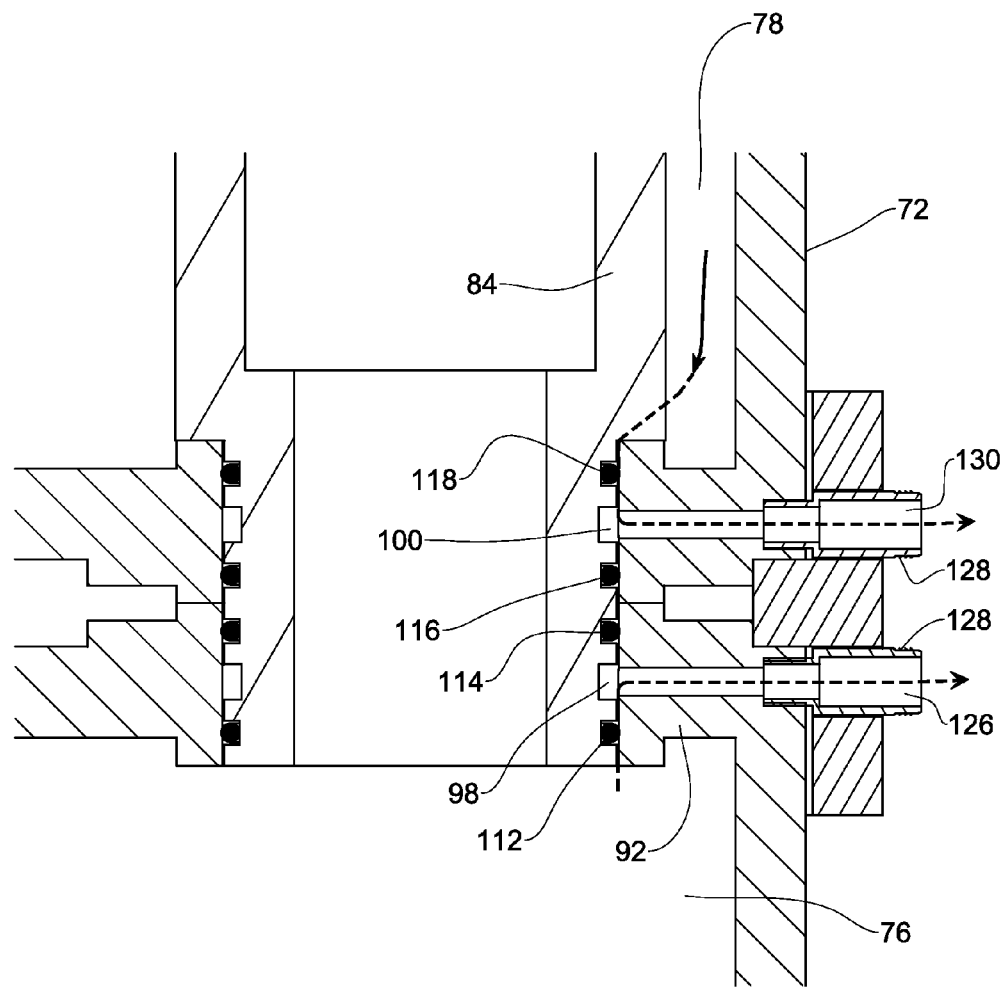
FIG. 5B is an enlargement of the portion marked VI in FIG. 5A.

The arrangement disclosed in FIGS. 4 and 5 is schematically represented in the flow chart of FIG. 8B wherein solid arrowed lines represent pressurized fluid flow during the course of its treating within the fluid treating system 70 and dashed arrowed lines represent leakage between either/or the raw fluid chamber, the fluid treating chamber or the filtration modules, as discussed hereinabove.

The provision of an intermediate chamber associated with each of the inlet chamber and fluid treating chamber (or with any other chamber of the fluid treating system) facilitates easy identification and distinction of a leak and its association with a respective source.

Figure 8B:
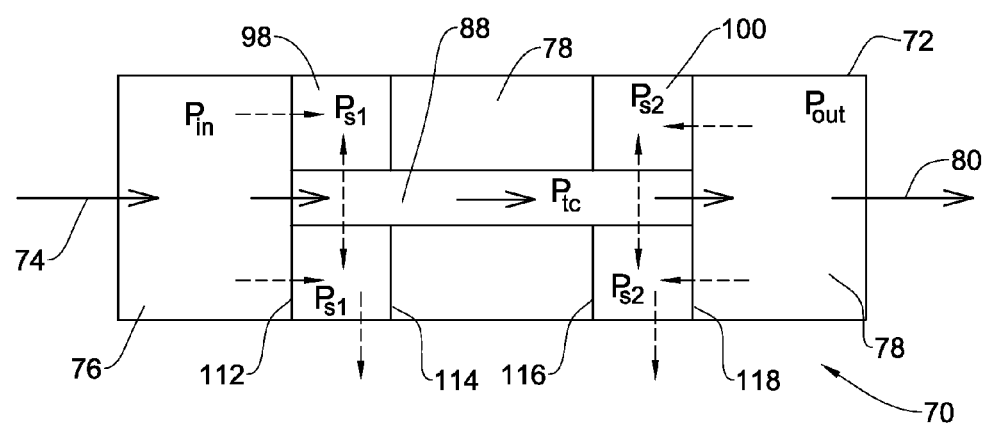

As represented in FIG. 8B, the pressure $P_{in}$ at the inlet port 74 and at the raw fluid chamber 76, and the pressure $P_{tc}$ at the fluid treating chamber 78 or the outlet pressure $P_{out}$ is higher than the pressure $P_{s1}$ and $P_{s2}$ at the intermediate chambers 98 and 100, respectively, namely:

$$P_{in} > P_{s1}; P_{s2} < P_{out}$$

This may also be represented as:

$$P_{in} > P_{s1} \approx P_{s2} < P_{out}$$

And likewise:

$$P_{in} > P_{tc} \geq P_{out}$$

Figure 6:
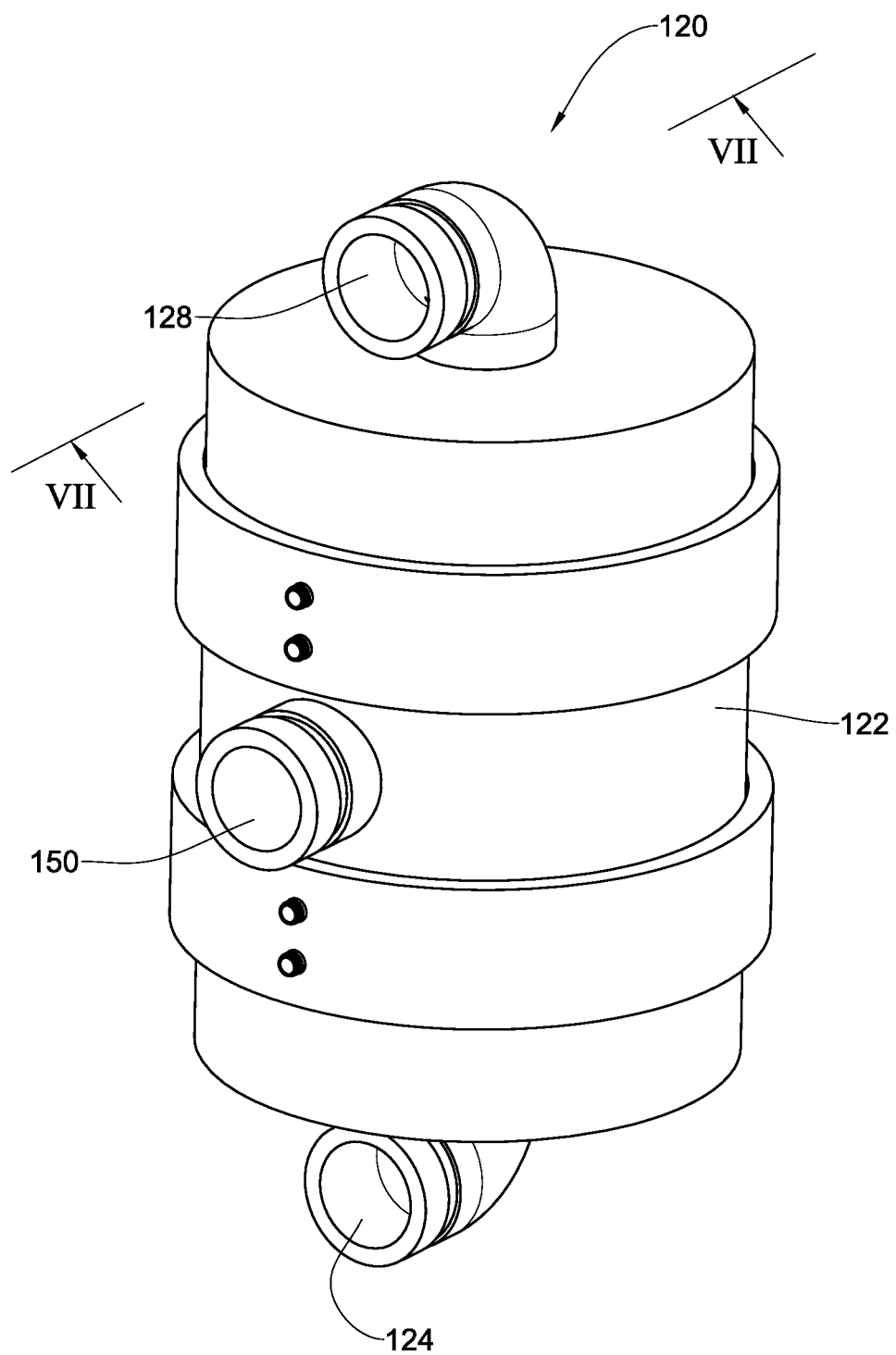
FIG. 6 is top perspective view of yet a fluid filter according to another example of the present disclosed subject matter.
Figure 7:
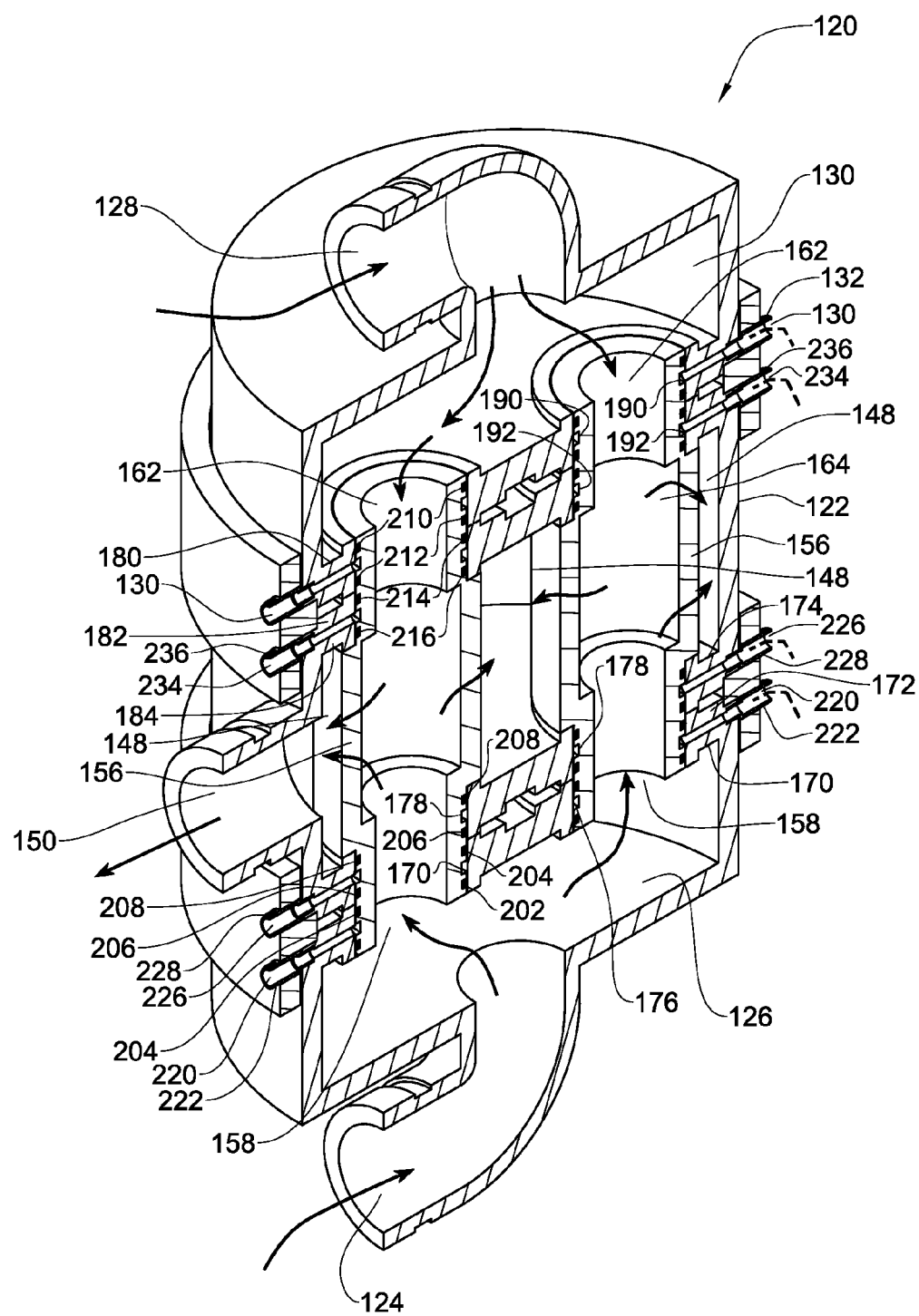
FIG. 7 is a longitudinal section along line VII-VII in FIG. 6.
Figure 8C:
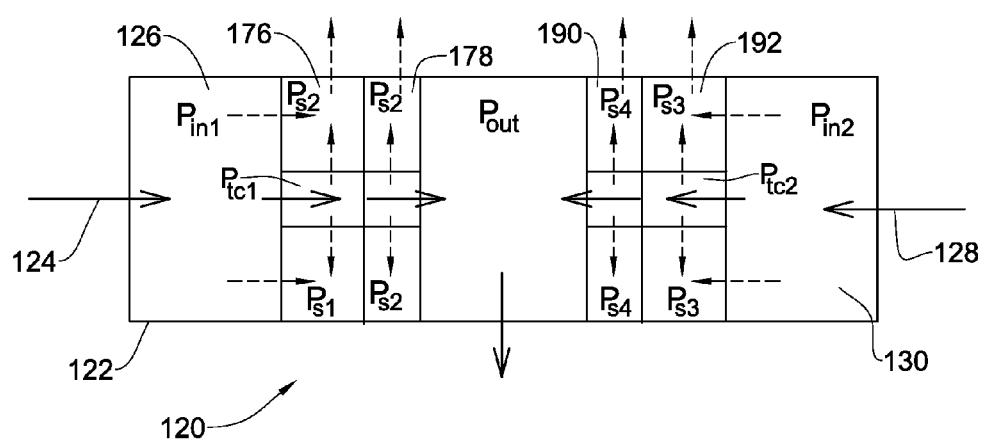

The embodiment illustrated in FIGS. 6 and 7, and schematically represented in FIG. 8C is directed to a fluid treating system 120 comprising a cylindrical housing 122 configured with a first fluid inlet port 124 (first raw fluid inlet port) at a bottom portion of the housing 122 and extending into a first raw fluid chamber 126. Extending at an upper portion of the housing 122 there is a second fluid inlet port 128 (second raw fluid inlet port) at a top portion of the housing 122 and extending into a second raw fluid chamber 130.

A fluid treating chamber 148 extends between the first raw fluid chamber 126 and the second fluid inlet port 128, said fluid treating chamber 148 is configured with a fluid outlet port 150. It is appreciated however, that fluid flow may take place in reverse direction too (i.e. ingress through port 150 and egress through one or both ports 124 and 128).

Extending within the fluid treating chamber 148 between the first raw fluid chamber 126 and the second raw fluid chamber 130 there are configured a pair of filtration modules 156, each having a bottom inlet 158 extending within the first raw fluid chamber 126 and a top inlet 162 extending within the first raw fluid chamber 126, said inlets 158 and 126 extending into a filtration space 164 of each of the filtration modules 156.

As discussed in connection with the examples of FIGS. 1 to 6, it is appreciated that the filtration modules can be any type of filtration module e.g. disc-type filtration modules, pile-type filtration modules, thread-type filtration modules, screen-type filtration modules and the like. Also, the number and configuration of the filtration modules may vary and further, rather then filtration modules there may be provided one or more other fluid treating units, e.g. mixers and the like.

It is further noted that the fluid treating chamber 148 is separated from the first raw fluid chamber 126 by three partition levels (i.e. walls), namely partitions 170, 172 and 174, thus defining between them two intermediate chambers, namely a first intermediate chamber 176 associated with the first raw fluid chamber 126, and a second intermediate chamber 178 associated with the fluid treating chamber 148 and with a coupling portion of the filtration modules 156. Likewise the fluid treating chamber 148 is separated from the second raw fluid chamber 126 by three partition levels (i.e. walls), namely partitions 180, 182 and 184, thus defining between them two intermediate chambers, namely a third intermediate chamber 190 associated with the second raw fluid chamber 126, and a fourth intermediate chamber 192 associated with the fluid treating chamber 148 and with a coupling portion of the filtration modules 156.

The first intermediate chamber 176 is sealingly separated from the first raw fluid chamber 126 and the second intermediate chamber 178 is sealingly separated from the fluid treating chamber 148, and likewise said first intermediate chamber 176 is sealingly separated from the second intermediate chamber 178, by a plurality of sealing members which in the present example are O-rings 202, 204, 206 and 208. Likewise, the third intermediate chamber 190 is sealingly separated from the second raw fluid chamber 130 and the fourth intermediate chamber 192 is sealingly separated from the fluid treating chamber 148, and said third intermediate chamber 190 is sealingly separated from the fourth intermediate chamber 192, by a plurality of sealing members which in the present example are O-rings 210, 212, 214 and 216, respectively.

However, it is appreciated that different sealing means may be provided such as a gasket, face-to-face sealing contact, etc.

Extending from the first intermediate chamber 176 there are two outlet ports 220 open to the atmosphere and configured with an external threading at 222 configured for coupling to a drainage pipe (not shown) or to a barrier to prevent egress of liquids, dirt, insects and the like. However, the barrier substantially does not cause pressure head loss. Extending from the second intermediate chamber 178 there are two outlet ports 226 open to the atmosphere also configured with an external threading 228. Similarly, the third intermediate chamber 190 is configured are two outlet ports 230 open to the atmosphere and configured with an external threading at 232 configured for coupling to a drainage pipe (not shown) or to a barrier to prevent egress of liquids, dirt, insects and the like. Extending from the fourth intermediate chamber 192 there are two outlet ports 230 open to the atmosphere also configured with an external threading 232.

The arrangement of the disclosure being such that raw fluid entering through the first fluid inlet port 124 and through the second inlet port 128 flows through the first raw fluid chamber 126 and the second raw fluid chamber 130 respectively, then through the inlets 158 and 162 of the filtration modules 156, wherein the fluid undergoes filtration by pressurizing it through the filtration modules 156 out to the fluid treating chamber 148 and then out of the filter treating system 120 through fluid outlet port 150. The fluid flow path is represented in the drawings by solid arrows.

At the event of leakage between the sealing arrangement (i.e. the O-rings) extending between the first raw fluid chamber 126 and the first intermediate chamber 176, and/or between the fluid treating chamber 148 and the second intermediate chamber 178, and/or between supports of the filtration modules 156 and either of the first and second intermediate chambers, or between the second raw fluid chamber 130 and the third intermediate chamber 190, and/or between the fluid treating chamber 148 and the fourth intermediate chamber 192, and/or between supports of the filtration modules 156 and either of the third and fourth intermediate chambers, any leaking fluids will necessarily flow from high pressure to low pressure zone i.e. into any one or more of the respective intermediate chambers which are vented to the atmosphere.

It is however appreciated that rather being vented to the atmosphere, any one or more of the first intermediate chamber 98, 100, 190 and 192 can reside at lower than atmospheric pressure, i.e. at vacuum.

In FIG. 7 a solid set of arrows represents fluid flow during the normal course of filtering a fluid entering the first raw fluid chamber 126 via first inlet port 124 and the second raw fluid chamber 130 via second inlet port 128 of the fluid treating system 120, and then into the filtration modules 156 wherein the fluid under pressure passes through the filtration media and exits from the filtration space 164 into the fluid treating chamber 148 and then exiting the system through outlet port 150. However, at the event of leakage, e.g. owing to failure or pinching of any one or more of the O-rings 200, 202, 204, 206 210, 212, 214 and 216, or owing to presence of dirt between the sealing components of the assembly, fluid may leak, as indicated by dashed arrows, from the raw fluid chambers 126 and 130, and/or from the fluid treating chamber 148 or from the vicinity of the filtration modules 156 into the intermediate chambers 176, 178, 190 and 192, respectively and from there drained out through the respective ports 122, 226, 230, and 234.

The arrangement disclosed in FIGS. 6 and 7 is schematically represented in the flow chart of FIG. 8C wherein solid arrowed lines represent pressurized fluid flow during the course of its treating within the fluid treating system 120 and dashed arrowed lines represent leakage between either/or the raw fluid chambers, the fluid treating chamber or the filtration modules, as discussed hereinabove.

The provision of an intermediate chamber associated with each of the inlet chamber and fluid treating chamber (or with any other chamber of the fluid treating system) facilitates easy identification and distinction of a leak and its association with a respective source.

As represented in FIG. 8C, the pressure $P_{in1}$ the first raw fluid chamber 126, the pressure $P_{in2}$ at the second raw fluid chamber 130 and the pressure $P_{tc}$ at the fluid treating chamber 148 or the outlet pressure $P_{out}$ is higher than the pressure at the respective intermediate chambers 176, 178, 190 and 192 $P_{s1}$, $P_{s2}$, $P_{s3}$ and $P_{s4}$, namely:

$$P_{in1} > P_{s1}; P_{s2} < P_{out}$$

$$P_{in2} > P_{s4}; P_{s3} < P_{out}$$

This arrangement ensures that a leak occurring at any location within the fluid treating system will flow from a high pressure zone towards a low pressure zone, and further facilitates easy identification and distinction of a leak and its association with a respective source.

Figure 9:
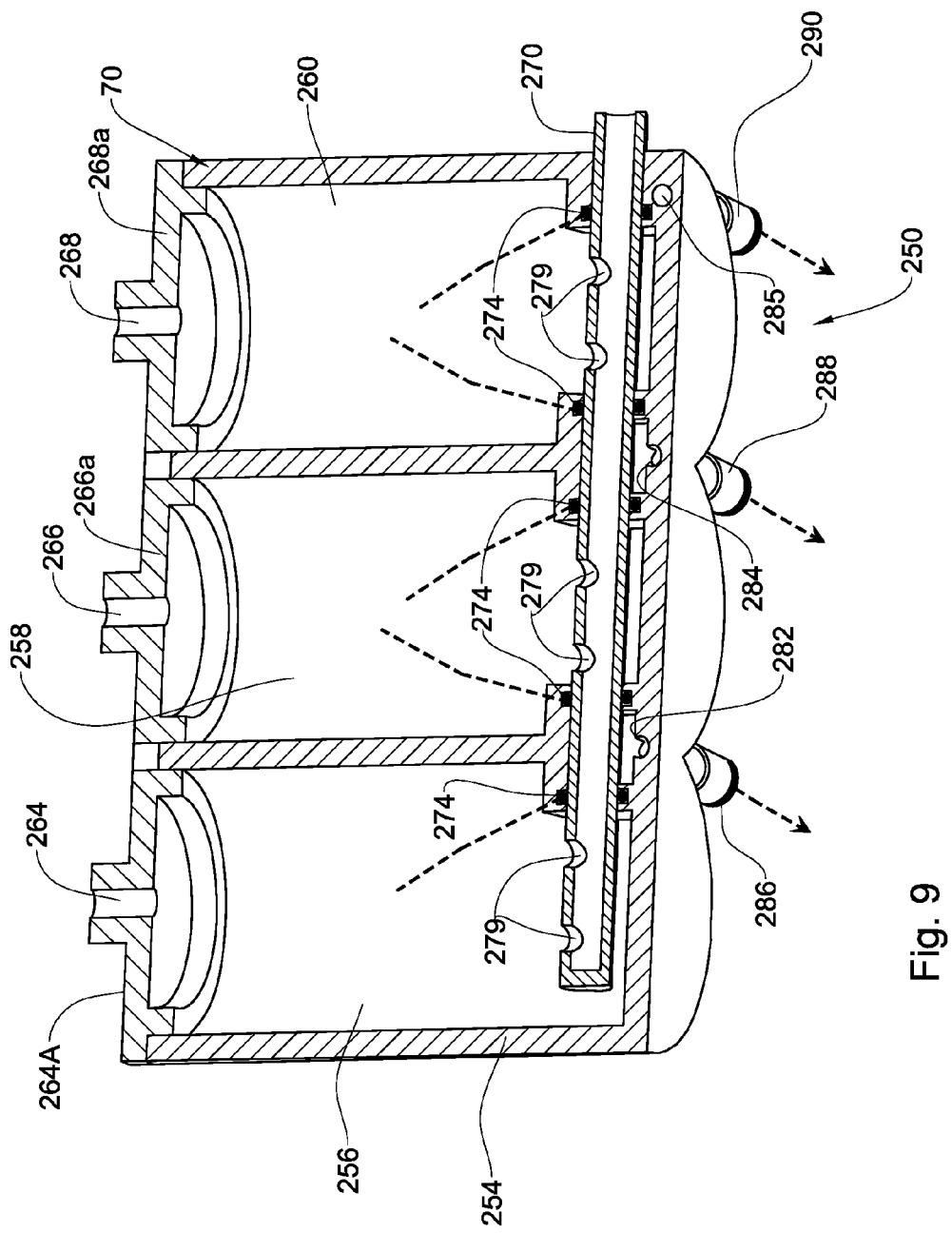
FIG. 9 is a representation of a portion of a different fluid treating system according to the disclosed subject matter.

With reference now being made to FIG. 9 there is illustrated a portion of a different fluid treating system according to the disclosed subject matter, namely a fluid mixer generally designated 250. The mixer comprises a housing 254 divided into three chambers 256, 258 and 260, parallely extending and sealed from one another, however each configured with an inlet 264, 266 and 268, respectively. A pressure cap 264A, 266A and 268A is configured within each chamber respectively, for retaining the fluid contained within each chamber under relative pressure.

A mixer axle 270 extends through the housing 254 and passes through each of the three chambers 256, 258 and 260. Sealing elements (O-rings in the example) 274 rotatably support the mixer axle 270 and seal the passages between the chambers. A vented intermediate chamber extends between neighboring chambers (vented intermediate chamber 282 extends between chambers 256 and 258; vented intermediate chamber 284 extends between chambers 258 and 260; and vented intermediate chamber 285 between the chamber 260 and the housing). Each of the vented chambers 282 and 284 is configured with an outlet 286 and 288, and 290, respectively.

Rotation of the mixer axle 270 entails rotation of mixer blades (not shown configured for mounting at receptacles 279) which results in mixing of the fluids contained within the chambers 256, 258 and 260.

However, at the event of leak at the vicinity of any of the O-rings supporting the reciprocating mixer axle 270, the leaking fluid will flow into the respective vented intermediate chamber 282, 284 or 285 and will then flow out of the mixer 250 through the respective outlet 286, 288 or 290.

As exemplified, leaking fluids overriding the sealing members (namely the O-rings 274) will flow from high pressure zone within the chambers to low pressure zone residing within the respective intermediate chambers and therefrom out of the system.

Whilst in the examples disclosed hereinabove reference is made to fluid treating systems being filtration units, it is appreciated that the disclosed subject matter is configurable for any fluid treating system, e.g. medicament administrating devices, fluid mixers, fluid chemical treating devices, etc.

The invention claimed is:

1. A fluid treating system comprising a housing configured with at least one fluid inlet port, a raw fluid chamber and at least one fluid outlet port, with at least one fluid treating chamber disposed between and being in flow communication with said at least one fluid inlet port and at least one fluid outlet port, wherein the at least one fluid treating chamber is separated from the raw fluid chamber by at least three partition walls, defining therebetween at least two intermediate chambers;
   wherein the at least two intermediate chambers are sealingly isolated from each other and from both the raw fluid chamber and the fluid treating chamber;
   wherein the at least two intermediate chambers are disposed between at least one fluid inlet port and at least one of the at least one fluid treating chamber and the at least one outlet port;
   wherein the at least two intermediate chambers are vented to the atmosphere or coupleable to a vacuum source;
   wherein the system further comprises at least one filtration module extending between the raw fluid chamber and the at least one fluid treating chamber, the at least one filtration module has an inlet extending within the raw fluid chamber, and wherein said inlet of the at least one filtration module extends into a filtration space of the at least one filtration module;
   wherein the at least two intermediate chambers are configured for coupling to a drain pipe.

2. A fluid treating system according to claim 1, wherein the system is arranged such that pressure at each respective inlet port (Pin), and pressure at the at least one fluid treating chamber (Ptc) or pressure at the least one outlet (Pout) is higher than pressure at the at least two intermediate chambers (Ps).

3. A fluid treating system according to claim 2, wherein the pressure at the at least one fluid treating chamber (Ptc) is substantially equal to the pressure at the at least one outlet port (Pout).

4. A fluid treating system according to claim 1, wherein the fluid treating chamber and the at least one outlet port are in direct flow communication and reside at substantially the same pressure.

5. A fluid treating system according to claim 1, wherein a first said intermediate chamber is associated with an upstream side of the fluid treating system and wherein a second said intermediate chamber is associated with a downstream side of the fluid treating system.

6. A fluid treating system according to claim 5, wherein said first and said second intermediate chambers are distinct.

7. A fluid treating system according to claim 1, wherein the outlets of the at least two intermediate chambers are fitted with a one-way valve.

8. A fluid treating system according to claim 1, wherein the fluid treating system is configured for treating any fluid.

9. A fluid treating system according to claim 1, wherein the fluid treating system is a liquid filter unit.

10. A fluid filter system according to claim 1, wherein the at least three partition walls are substantially parallel to each other.

11. A fluid treating system according to claim 1, wherein the at least two intermediate chambers comprise a first said intermediate chamber associated with an upstream side of the fluid treating system and a second said intermediate chamber associated with a downstream side of the fluid treating system, said first intermediate chamber being different from said second intermediate chamber.

12. A fluid treating system according to claim 1, wherein said at least two intermediate chambers comprises a first intermediate chamber and a second intermediate chamber, wherein said first intermediate chamber is associated with an upstream side of the fluid treating system and wherein said second intermediate chamber is associated with a downstream side of the fluid treating system.

* * * * *